(12) United States Patent
Karandikar et al.

(10) Patent No.: US 9,819,401 B2
(45) Date of Patent: Nov. 14, 2017

(54) HIGHLY SELECTIVE LOW-POWER CARD DETECTOR FOR NEAR FIELD COMMUNICATIONS (NFC)

(71) Applicant: Intel IP Corporation, Santa Clara, CA (US)

(72) Inventors: Niranjan Karandikar, Campbell, CA (US); Sebastien Fievet, Cupertino, CA (US); Sathish Kuttan, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 13 days.

(21) Appl. No.: 14/864,015

(22) Filed: Sep. 24, 2015

(65) Prior Publication Data

US 2017/0093464 A1    Mar. 30, 2017

(51) Int. Cl.
*H04B 5/00* (2006.01)
*G06K 7/10* (2006.01)

(52) U.S. Cl.
CPC ......... *H04B 5/0056* (2013.01); *H04B 5/0025* (2013.01); *G06K 7/10237* (2013.01); *H04B 5/0075* (2013.01)

(58) Field of Classification Search
CPC .. H04B 5/0056; H04B 5/0025; H04B 5/0075; H04B 5/00; H04B 5/0037; H04B 5/0081; H04B 5/0093; H04B 1/40; H04B 5/0012; H04B 5/0031; H04B 5/02; H02J 5/005; H02J 17/00; G06K 19/0723; G06K 19/0717; G06K 19/0726; G06K 19/07769; G06K 19/07786; G06K 7/0008; G06K 7/10009; G06K 7/10237
See application file for complete search history.

(56) References Cited

U.S. PATENT DOCUMENTS

| | | | | |
|---|---|---|---|---|
| 2008/0079587 | A1* | 4/2008 | Rofougaran | G06K 19/07786 340/572.7 |
| 2009/0109032 | A1* | 4/2009 | Braun | G06K 19/0723 340/572.1 |
| 2012/0119808 | A1* | 5/2012 | Motozawa | H04B 1/40 327/270 |
| 2012/0146425 | A1* | 6/2012 | Lee | H02J 5/005 307/104 |
| 2013/0017782 | A1* | 1/2013 | Tay | G06K 7/10237 455/41.1 |
| 2013/0281016 | A1* | 10/2013 | McFarthing | H04B 5/00 455/41.1 |
| 2015/0349541 | A1* | 12/2015 | Yamamoto | G01V 3/10 307/104 |

* cited by examiner

*Primary Examiner* — Golam Sorowar
(74) *Attorney, Agent, or Firm* — Schiff Hardin LLP

(57) ABSTRACT

Described herein are architectures, platforms and methods for implementing low-power detection of a near field communication (NFC) card or tags. In particular, an NFC antenna is integrated with at least one transistor to form an oscillator. A substantial decrease in oscillator's oscillation indicates presence or detection of the NFC card or tag.

20 Claims, 4 Drawing Sheets

HIGHLY SELECTIVE LOW-POWER CARD DETECTOR FOR NEAR FIELD COMMUNICATIONS (NFC)

BACKGROUND

In systems and devices implementing near field communication (NFC), an NFC reader/writer device may communicate with several NFC enabled devices. Such NFC enabled devices may be passive, meaning that they have no power. In a typical implementation, the coupling between the passive NFC enabled devices and the NFC reader/writer device may power up the NFC enabled devices to perform an NFC transaction or communications.

The NFC reader/writer device may constantly perform an operation to detect presence of a target NFC card or tag that may be in proximity with the NFC reader/writer device. In this scenario, high power consumption shortens a battery life of a mobile device when the NFC reader/writer device periodically generate magnetic fields to detect the target NFC card or tag. Foreign objects such as metals, keys etc. are falsely detected as well and to this end, the NFC reader/writer device wakes up to attempt a transaction that consumes more power and further shortening the battery life of the mobile device.

As such, there is a need to provide a solution that may at least solve the problem of avoiding high power consumption and false detections during detection of the NFC targets.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Described herein are architectures, platforms and methods for a low-power (i.e., near zero power) card or tag detection in a portable device such as an NFC reader/writer device. As described herein, the low-power card/tag detection, or generally referred to as NFC enabled device detection, may be implemented while an NFC operation of the NFC reader/writer device is at inactive mode. That is, components such as power amplifiers that transmit full power, for example, during an NFC data communication operation are at standby mode to conserve power within the portable device (i.e., NFC reader/writer device).

In an implementation, an NFC antenna of the NFC reader/writer device is integrated or recombined with existing components within the NFC reader/writer device to form an oscillator. For example, during card or tag detection mode, existing components (e.g., transistors) that are not used during inactive NFC operation (in the NFC reader/writer device) may be integrated or recombined with the NFC antenna and associated tuning network (e.g., capacitors) to form the oscillator such as a Pierce Oscillator. In this example, the Pierce Oscillator may be configured to scan and detect cards, tags, or other NFC enabled devices using different resonant frequencies corresponding to individual frequency of operation of the card, tag, or NFC enabled device to be detected. After detection of the particular card, tag, or NFC enabled device, the existing components may be configured or switched back to their original configuration such that the Pierce Oscillator may be formed again on a subsequent scanning or detection of the NFC card or tag.

As described herein, the formed Pierce Oscillator, for example, resonates at a particular resonant frequency of 13.56 MHz to detect an NFC enabled device. In this example, when a NFC card is placed within a certain distance from the NFC antenna of the NFC reader/writer device, an increase in coupling between NFC card antenna and the integrated NFC antenna increases a real part impedance of the NFC antenna which in turn increases loss in Pierce Oscillator oscillations. Such loss increase may subsequently stop the oscillations in the Pierce Oscillator indicating presence or detection of the NFC card. In other implementations, a particular threshold may be configured to define the amount of oscillation loss that indicates detection or presence of the card.

With the detected NFC card presence, the NFC operation in the NFC reader/writer device is activated and existing components that are used to form the Pierce Oscillator are switched back to their original configurations. Furthermore, the particular resonant frequency used for detecting the NFC enabled device (i.e., 13.56 MHz) is utilized to communicate data to or from the NFC enabled device.

Figure 1:
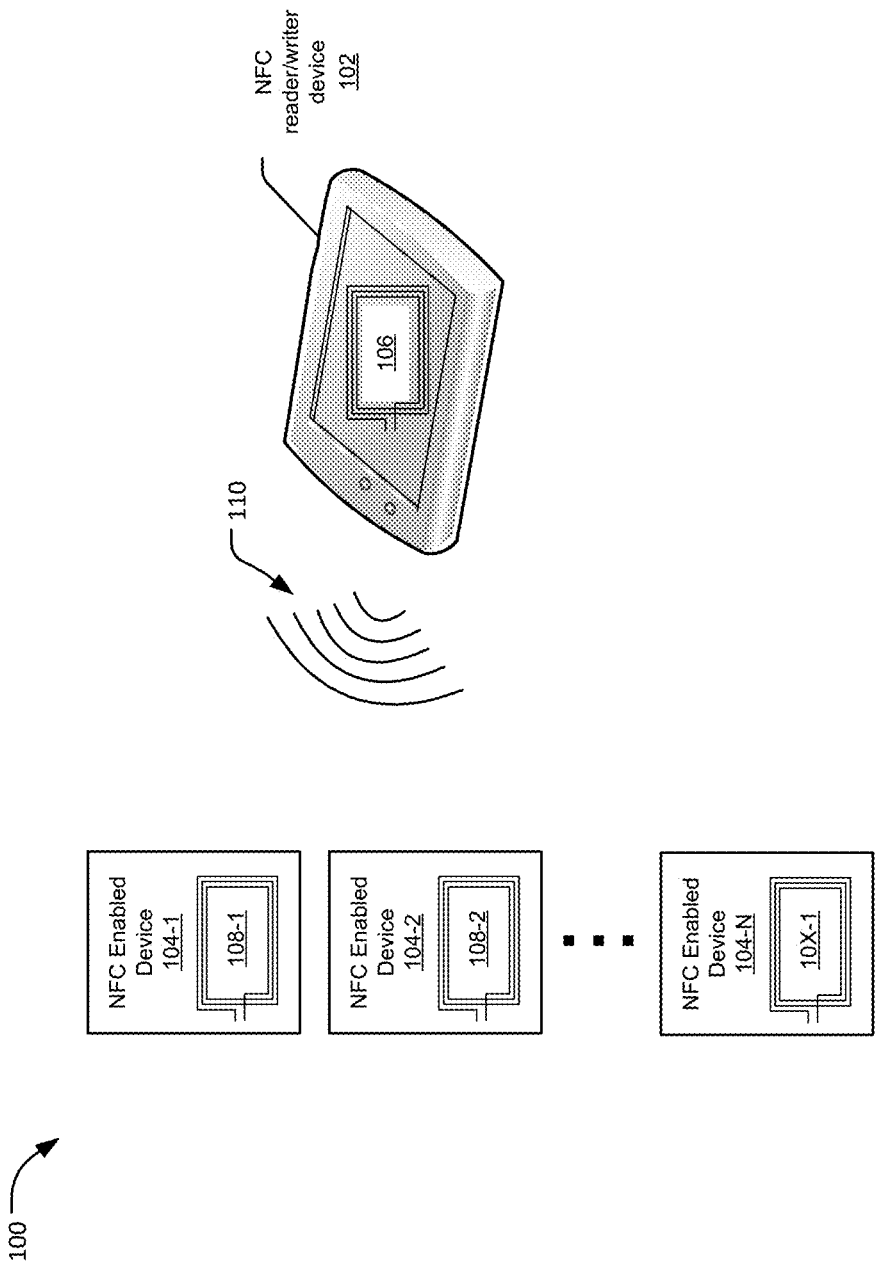
FIG. 1 is an example scenario illustrating a near field communication (NFC) reader/writer device communicating with one or more NFC enabled devices as described in implementations herein.

FIG. 1 is an example scenario 100 that illustrates a near field communication (NFC) reader/writer device 102 communicating with one or more NFC enabled devices 104. The NFC enabled device(s) 104 may be passive such as NFC card or tags, or active devices such as NFC enabled phones. The NFC enabled devices 104 may further include contactless smart enabled devices that are capable of receiving data from and or transmitting data to the NFC reader/writer device 102.

The NFC reader/writer device 102 may include an antenna 106, which may be part of or connected to a NFC controller or module (not shown) in the NFC reader/writer device 102. The antenna 106 may transmit an electromagnetic signal that creates, for example, an RF field 110 during a read and/or write operations on the NFC enabled devices 104. As described herein, each of the NFC enabled devices 104 may include their respective antennas 108.

In an implementation, as a mode of detecting presence of the NFC enabled devices 104 by the NFC reader/writer 102, the NFC reader/writer device 102 may be configured to integrate its antenna 106 with other existing components (e.g., capacitors, resistors, inductors, transistors) within the NFC controller or module to form, for example, a Pierce Oscillator. In this example, the Pierce Oscillator is a type of electronic oscillator that may be implemented using a minimum number of components such as resistors, capacitors, transistors, etc. In another example, the existing components may be taken from other circuitries and not limited to available components within the NFC controller or module.

With the formed Pierce Oscillator, the detection of the NFC enabled devices 104 may depend upon a particular operating or resonant frequency of the NFC enabled devices 104 to be detected. For example, to detect an NFC card or tag that operates at standard NFC frequency of 13.56 MHz, the Pierce Oscillator is configured to oscillate at 13.56 MHz in order to detect presence of the NFC card or tag. In this example, the detection may be based upon an increased coupling between the antenna 106 and the other antenna 108 of the NFC enabled devices 104 at the particular operating frequency.

For example, when an NFC enabled device 104-2 is within a particular distance (e.g., 10 mm) from the antenna 106 of the NFC reader/writer device 102, an input impedance (or reflective impedance) at the antenna 106 is created due to increased coupling between the antenna 108-2 and the antenna 106. In this example, the input impedance may be utilized as the mode of low-power detection by a detector (not shown), for example, that may be disposed on the NFC controller or module. The input impedance, in this case, may include different amount of impedance that correspond to different electrical characteristic (e.g., resonant frequency) and/or physical orientation of the coupling NFC enabled device 104. Furthermore, the input impedance generates losses in the formed Pierce Oscillator such that the Pierce Oscillator's oscillation will be substantially decreased. As further described below, the increase in losses will subsequently stop or substantially decrease the oscillation of the Piece Oscillator thereby indicating presence of detection of the NFC enabled device 104-2.

With the detected presence of the NFC enabled device 104-2, the NFC reader/writer device 102 may activate its NFC feature to read or write data into the NFC enabled device 104-2. In this configuration, false detection of metals, for example, are avoided since the metals do not resonate at a given particular resonant frequency (e.g., 13.56 MHz) and therefore, do not generate losses in the Pierce Oscillator's oscillation. Furthermore, the NFC reader/writer device 102 may conserve power consumption in the detection process because the detector as described herein requires substantially low power. Furthermore still, the detector does not require the use of an external clock since the detection is based upon presence of absence of oscillation in the formed Pierce Oscillator.

Figure 2:
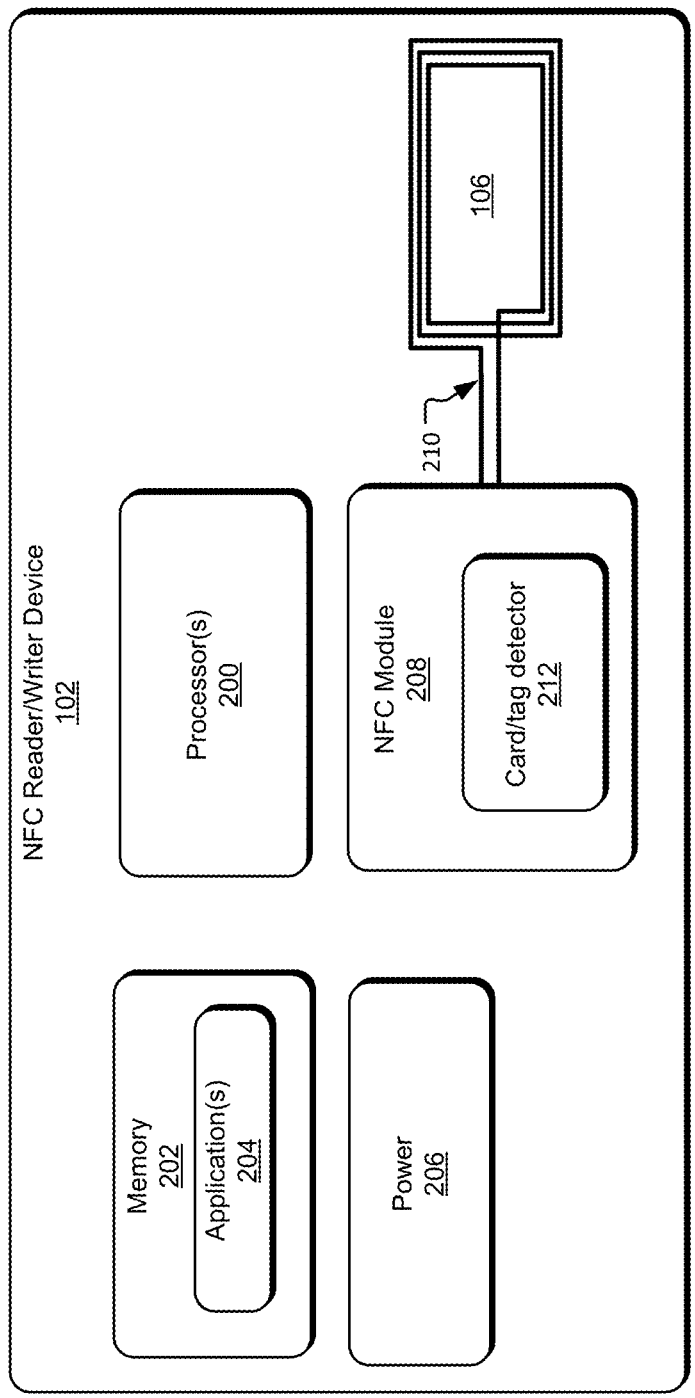
FIG. 2 is an example block diagram of a near field communication (NFC) reader/writer device as described in implementations herein.

FIG. 2 shows an example NFC reader/writer device 102 as described in present implementations herein. The NFC reader/writer device 102 may include, but is not limited to, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like. The NFC reader/writer device 102 may further include, but is not limited to, non-portable devices such as a personal computer, nor limited to wireless devices such as when connected through a cable.

The NFC reader/writer device 102 may include one or more processors 200, and a memory 202 coupled to the one or more processors 200. Memory 202 may be a non-transitory memory/media that includes various types of storage, including read only, random access and the like. Memory 202 may also include programming/non-programmable firmware. Particular elements described herein as hardware may be implemented in firmware as part of memory 202. Memory 202 may particularly include applications 204 which may be NFC enabled software/firmware applications.

The NFC reader/writer device 102 may include a power component 206. The power component 206 may include various AC and/or DC elements, such as batteries. Furthermore, the power component 206 drives and provides power to various other components of NFC reader/writer device 102, including power amplifiers (not shown).

The NFC reader/writer device 102 may include an NFC controller or NFC module 208. The NFC module 208 may be configured to communicate with other NFC enabled devices such as the NFC enabled device 104. The NFC module 208 may be connected to the antenna 106 through a cable link 210. However, for the detection of the NFC enabled device 104 as described herein, the NFC module 208 may include the antenna 106 that is recombined with existing components such as a transistor within the NFC module 208.

For example, during an inactive NFC data communication operation on the NFC reader/writer device 102, components such as at least one transistor, capacitor, resistor, etc. that are not currently used within the NFC module 208 may be combined with the antenna 106 to form the Pierce Oscillator. In this example, the at least one transistor, capacitor, resistor, etc. are configured back to their original functions once the detection of the NFC enabled device 104 by the NFC reader/writer device 102 is made.

As described herein, the NFC reader/writer device 102 includes a card or tag detector 212 that may be configured to integrate the antenna 106 with the existing components such as capacitors, resistors, oscillator, etc. to form the Pierce Oscillator. With the formed Pierce Oscillator, the card or tag detector 212 may receive signals from the processor 200 in order to resonate at different frequencies at different time periods (e.g., different resonant frequency every 10 msecs) to implement scanning and detection of different types of NFC enabled device 104. Furthermore, in other implementations, the card or tag detector 212 may receive a threshold value from the processor 200 where the threshold value may be configured to define presence or absence of oscillation in the Pierce Oscillator.

For example, the processor 200 transmits a signal for the antenna 106 to resonate at 13.56 MHz. In this example, when the NFC enabled device 104 with an operating frequency of 13.56 MHz is brought near the antenna 106, an increase in the coupling coefficient (i.e., K) between the antenna 108 and the antenna 106 may increase real part of impedance as seen at the side of the antenna 106. The increase in the real part of impedance creates loss at the formed Pierce Oscillator such that the oscillation (e.g., amplitude) at the particular frequency (e.g., 13.56 MHz for NFC operation) will disappear. Based from the decreasing oscillation amplitude of the Pierce Oscillator, the low-power (i.e., near zero power) card detection is facilitated and the subsequent activation of NFC data communication operation saves power on the NFC reader/writer device 102. In other implementations, the threshold value from the processor 200 may define the amount of decreased oscillation amplitude that indicates detection or presence of the NFC enabled device 104.

Figure 3:
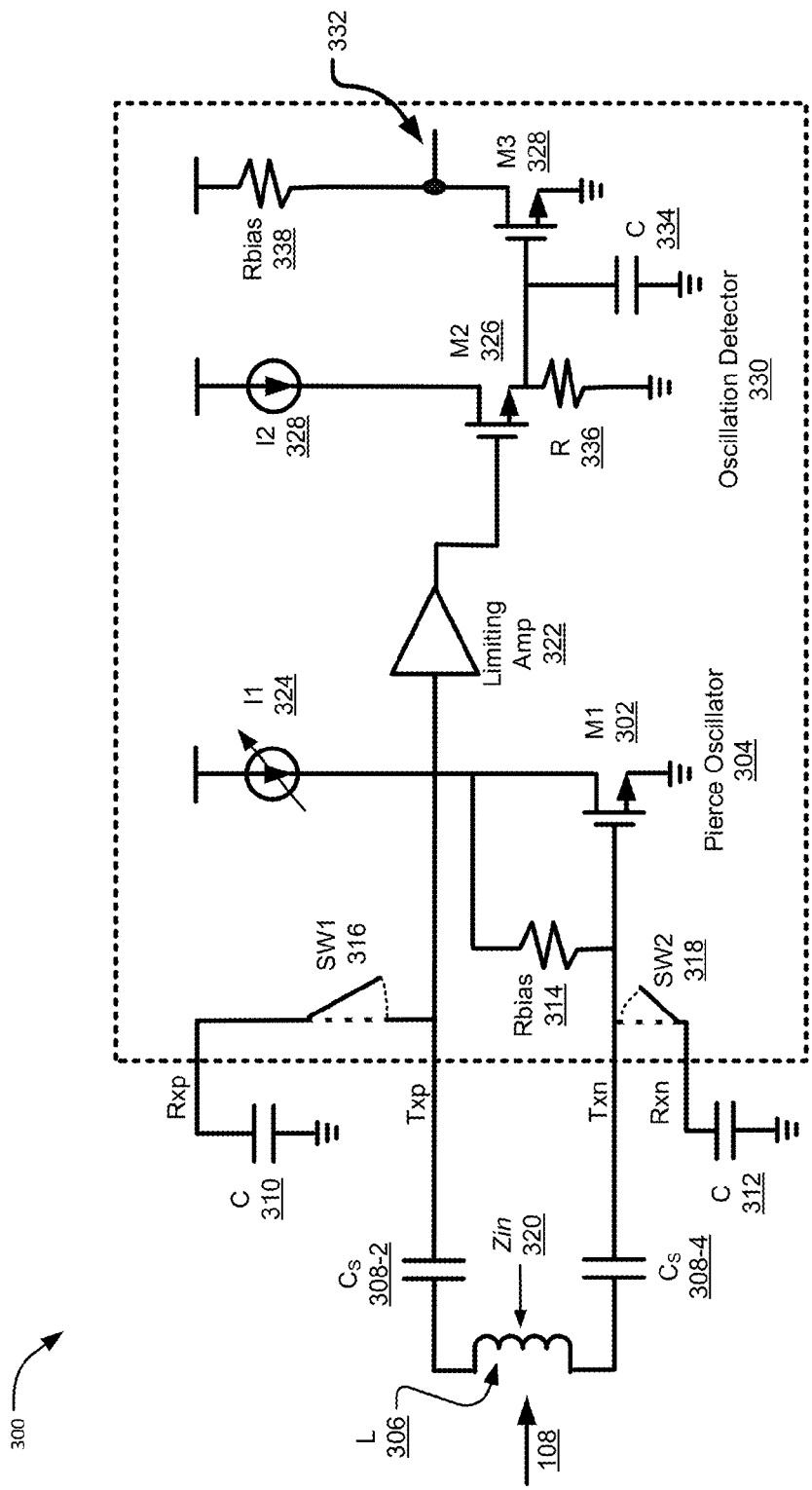
FIG. 3 is an example card or tag detector architecture as described in present implementations herein.

FIG. 3 shows an example card or tag detector architecture 300 as described in present implementations herein. The architecture 300 may represent an example implementation of the card or tag detector 212 of FIG. 2 during the low-power card or tag detection mode. That is, the card or tag detector 212 integrates the antenna 106 with other existing components within the NFC reader/writer device 102 to form the Pierce Oscillator where the absence or presence of Pierce Oscillator's oscillation is utilized as the basis for the low-power card detection mode as described herein.

In an implementation, the card or tag detector architecture 300 may receive a signal (not shown) from the processor 200 to oscillate at a particular resonant frequency. For example, the integrated antenna 106 together with a first transistor M1 302 may form a Pierce Oscillator 304. In this example, the received signal may trigger the Pierce Oscillator 304 to resonate at the particular resonant frequency.

As shown, an inductor L 306 represents the antenna 106 while capacitors Cs 308-2 and 308-4 may represent matching network for the antenna 106. On the other hand, capacitors 310 and 312, and a biasing resistor $R_{bias}$ 314 are the existing components from the NFC module 208 where the capacitors 310 and 312 are utilized to increase frequency range of operation of the architecture 300. As described in present implementations herein, the inductor L 306, capacitors 310, 312, 314, and the biasing resistor $R_{bias}$ 314 are integrated to form the Pierce Oscillator 304, which includes higher frequency variance or higher frequency range of operation.

During the card detection mode, switches SW1 316 and SW2 318 are configured to couple the capacitors 310 and 312, respectively, with the first transistor M1 302 and the antenna 106 to form the Pierce Oscillator 304. At the card detection mode, the NFC data communication operation of the NFC reader/writer device 102 is at inactive state and as such, the first transistor M1 302, capacitors 310 and 312, and other components that may be utilized during the NFC data communication operation may be utilized for the present low-power card detector. Although the architecture 300 shows a limited number of switches (i.e., SW1 316 and SW2 318) to couple the capacitor components 310 and 312, other switches (not shown) may be employed to couple existing components (e.g., transistor M1 302) to implement the architecture 300 as described herein.

With continuing reference to FIG. 3, the Pierce Oscillator 304 may be configured to oscillate at different resonant frequencies in order to scan different types of NFC enabled devices 104 that correspondingly operate at different resonant frequencies. For example, in order to detect two different types of NFC enabled devices 104 that operates at a first resonant frequency and a second resonant frequency, respectively, the Pierce Oscillator 304 may be configured to oscillate at the first resonant frequency for a first time period, and at the second resonant frequency for a second time period. In this example, the Pierce Oscillator 304 may respond to input impedance as seen at the inductance L 306 at different resonant frequencies rather than being limited to the detection of one type of NFC enabled device 104.

For a given input impedance due to increase in coupling between the inductance L 306 and the antenna 108 of the NFC enabled device 104, the oscillation of the Piece Oscillator 304 decreases due to an increase in the real part of impedance Zin 320 as seen at the antenna 106 of the architecture 300.

In an implementation, a limiting amplifier 322 is coupled to an output of the first transistor M1 302 where the limiting amplifier 322 may be further derived from existing components within the NFC module 208 as described above. In this implementation, the limiting amplifier 322 may convert sine wave to square wave signals by detecting zero crossings. Furthermore, the limiting amplifier 322 may provide an output that may indicate presence of the NFC enabled device 104 based upon the presence or absence of oscillation in the Pierce Oscillator 304.

For example, a small amount of current I 324 may be utilized by the Pierce Oscillator 304 to sustain an oscillation at a particular frequency (e.g., 13.56 MHz). Upon positioning of the NFC enabled device 104 within a certain distance (e.g., 10 mm) from the inductor L 306, an increase in coupling "K" creates corresponding increase of the reflective impedance as seen at the inductor L 306. The increase in the reflective impedance may cause losses at the antenna 106, which substantially decreases the oscillation of the Pierce Oscillator 304.

Based from the substantially decreased oscillation at the Pierce Oscillator 304, the limiting amplifier 322 may supply a signal that turns OFF a second transistor M2 326. In this example, the second transistor M2 326 and a third transistor M3 328 may be configured as switch-transistors to form an oscillation detector 330. That is, the third transistor M3 328 provides a logic LOW (i.e., low voltage) at output 332 when the Pierce Oscillator 304 is oscillating, and a logic HIGH (i.e., high voltage) when there is no oscillation due to the reflective impedance.

For the logic HIGH output, a capacitor C 334 discharges to the direction of a resistor 330 and as such, the third transistor M3 328 will be at OFF state. At this state, the high voltage at the output 332 may be dictated by a biasing resistor 336.

Figure 4:
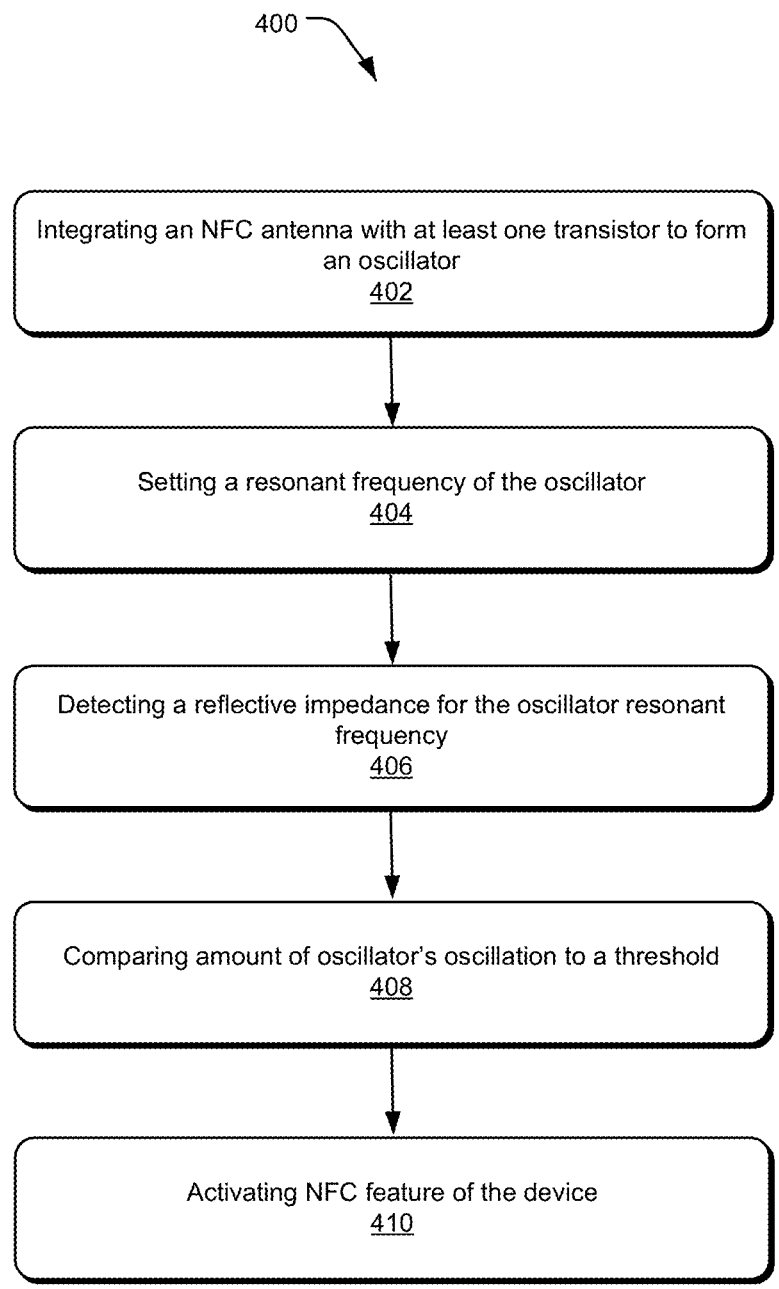
FIG. 4 is an example flow chart illustrating an example method for low-power card or tag detection using existing components within an NFC device.

FIG. 4 shows an example process chart 400 illustrating an example method for low-power card or tag detection using existing components within an NFC device. For example, the low-power card or tag detection is implemented while an NFC data communication is at inactive mode. In this example, the components that are not utilized during the inactive mode are diverted and used for the card or tag detection. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 402, integrating an NFC antenna with at least one transistor to form an oscillator is performed. For example, during card or tag detection mode, the operation of NFC data communication is at inactive mode to conserve power in the portable device. In this example, existing components such as the transistor M1 302, which is originally configured and utilized for the operation of the NFC data communication, is integrated with the NFC antenna 106 to form the Pierce Oscillator 304.

At block 404, setting a resonant frequency of the formed oscillator is performed. For example, the processor 200 facilitates multiple resonant frequency adjustments at different time periods to detect and distinguish different types of NFC enabled device 104. In this example, the Pierce Oscillator 304 receives the signal from the processor 200 in order to scan at different resonant frequencies. The scanning at different frequencies may facilitate detection and determination of the particular type of NFC enabled device 104 to be detected.

For example, a particular NFC enabled device 104 resonates at a resonant frequency of 13.56 MHz. In this example, the detection of the NFC enabled device 104 is implemented when the Pierce Oscillator 304 scans at the resonant frequency of 13.56 MHz. In another example, the NFC enabled device 104 operates at a frequency other than 13.56 MHz and to this end, the Pierce Oscillator 304 may be adjusted or configured to scan from one setting of resonant frequency (e.g., 13.56 MHz) to the other setting of resonant frequency.

In these examples, the setting of the particular resonant frequency that is utilized for detecting card is the same setting of the resonant frequency that may be used for data communication.

At block 406, detecting a reflected impedance for the set oscillator resonant frequency is performed. For example, when the antenna 108 of the NFC enabled device 104 is positioned near the antenna 106 of the NFC reader/writer device 102, there will be an increase in coupling between the antenna 108 and the NFC antenna 106 assuming that they both resonate at about the same frequencies (e.g., 13.56 MHz). In case of false detection such as when a metal is positioned near the antenna 106, there will be no increase in coupling nor increase in reflective impedance as the metal does not resonate at resonant frequencies configured on the NFC reader/writer device 102.

At block 408, comparing amount of oscillation to a threshold is performed. For example, the reflected impedance generates a particular amount of oscillation. In this example, the threshold may be utilized to determine the amount of oscillation that indicates presence or absence of NFC enabled device 104. In this example still, the processor 200 may determine right away the presence or absence of the NFC enabled device based on the threshold value.

In another implementation, the configured threshold is not required as the oscillation detector 330 (i.e., second transistor M2 326 and M3 328) may be configured to turn ON or OFF at a particular input voltage. As such, the particular input voltage may be the threshold value to detect presence or absence of the NFC enabled device 104.

As described herein, the limiting amplifier 322 is integrated with at least another transistor M2 326 and transistor M3 328 to form the oscillation detector 330. The limiting amplifier 322 may serve as a protection to subsequent components such as the second transistor M2 326 and M3 328.

At block 410, activating an NFC feature is performed. For example, when the reflective impedance generates substantial decrease of oscillation of the Pierce Oscillator 304 to indicate detection of the NFC enabled device 104, the NFC reader/writer device 102 may activate its NFC operation to perform NFC related data communication with the NFC enabled device 104. In this example, there is no need for external clock in the implementation of the NFC enabled device detection.

The following examples pertain to further embodiments:

Example 1 is a device comprising: a processor; a card or tag detector coupled to the processor, wherein the card or tag detector is configured to: integrate a near field communication (NFC) antenna with at least one transistor component to form an oscillator that resonates at a particular resonant frequency on a particular time period; detect a reflective impedance at the particular resonant frequency, wherein the reflective impedance substantially decreases oscillation of the oscillator; and activate operation of NFC data communication in response to a substantial decrease in the oscillation of the oscillator.

In example 2, the device as recited in example 1, further comprising a switch for toggling function of the at least one transistor component as a card detector component, or as a component during the operation of the NFC data communication upon detection of an NFC card or tag by the card or tag detector.

In example 3, the device as recited in example 1, wherein the particular resonant frequency comprises about 13.56 MHz for NFC card or tags.

In example 4, the device as recited in example 1, wherein the oscillator is a Pierce Oscillator.

In example 5, the device as recited in example 1, wherein substantial decrease in the oscillation indicates detection of a NFC enabled device.

In example 5, the device as recited in example 5, wherein the detection of the NFC enabled device is independent of an external clock.

In example 7, the device as recited in example 1, wherein the reflective impedance is due to increased coupling between the integrated NFC antenna and another antenna of an NFC enabled device.

In example 8, the device as recited in examples 1 to 7 further comprising an oscillation detector configured to detect the substantial decrease in oscillation of the oscillator.

In example 9, the device as recited in example 8, wherein the oscillation detector comprises a limiting amplifier and a second transistor configured as a switch-transistor that generates a logic low output or a logic high output.

Example 10 is a card or tag detector comprising: a near field communication (NFC) antenna; at least one transistor component integrated to the NFC antenna forming an oscillator, wherein a reflective impedance substantially decreases oscillation of the oscillator; an oscillation detector configured to detect presence of a coupling card or tag based on a substantially decreased oscillation of the oscillator.

In example 11, the card or tag detector of example 10, wherein the oscillator resonates at a particular resonant frequency that comprises about 13.56 MHz for NFC card or tags.

In example 12, the card or tag detector of example 11, wherein the particular resonant frequency is utilized to avoid false detection of metals.

In example 13, the card or tag detector of example 10, wherein the oscillator is a Pierce Oscillator.

In example 14, the card or tag detector of example 10, wherein the oscillation detector comprises a limiting amplifier and another transistor configured as a switch-transistor that generates a logic low output or a logic high output.

In example 15, the card or tag detector of any of example 10 to 14, wherein the substantial decrease in the oscillation is due to increased coupling between the NFC antenna and a second antenna of an NFC enabled device Example 16 is a method of low-power near field communication (NFC) card or tag detection, the method comprising: integrating an NFC antenna with at least one transistor to form an oscillator; setting an oscillator resonant frequency; detecting a reflective impedance for the oscillator resonant frequency, wherein the reflective impedance facilitates a substantial loss of oscillator oscillation; activating operation of an NFC data communication based upon the substantial loss of the oscillator oscillation.

In example 17, the method of example 16, wherein the integration comprises switching the at least one transistor to recombine with the NFC antenna.

In example 18, the method of example 16, wherein the oscillator resonant frequency comprises about 13.56 MHz.

In example 19, the method of example 16, wherein the formed oscillator is a Pierce Oscillator.

In example 17, the method of any of examples 16 to 19, wherein the substantial loss of the oscillator oscillation indicates presence or detection of the NFC card or tag.

What is claimed is:
1. A device comprising:
a processor;
a near field communication (NFC) antenna;

a card or tag detector coupled to the processor and the NFC antenna, wherein the card or tag detector further comprises:
  at least one transistor component integrated with the NFC antenna to form an oscillator that resonates at a particular resonant frequency on a particular time period, wherein the at least one transistor component is configured to operate as a card detector component or as an NFC data communication component;
  at least one switch component to switch operation of the at least one transistor component to detect a reflective impedance at the particular resonant frequency of the oscillator when operating as the card detector component, and to operate as the NFC data communication component upon detecting the reflective impedance that is substantially decreasing the oscillation of the oscillator.

2. The device of claim 1, wherein an NFC data communication operation is at inactive state when the at least one transistor component operates as the card detector component.

3. The device of claim 1, wherein the particular resonant frequency comprises about 13.56 MHz for NFC card or tags.

4. The device of claim 1, wherein the oscillator is a Pierce Oscillator.

5. The device of claim 1, wherein substantial decrease in the oscillation indicates detection of a NFC enabled device.

6. The device of claim 5, wherein the detection of the NFC enabled device is independent of an external clock.

7. The device of claim 1, wherein the reflective impedance is due to increased coupling between the integrated NFC antenna and another antenna of an NFC enabled device.

8. The device of claim 1 further comprising an oscillation detector configured to detect the substantial decrease in oscillation of the oscillator.

9. The device of claim 8, wherein the oscillation detector comprises a limiting amplifier and a second transistor configured as a switch-transistor that generates a logic low output or a logic high output.

10. A card or tag detector comprising:
  a near field communication (NFC) antenna;
  at least one transistor component integrated to the NFC antenna forming an oscillator that resonates at a particular frequency on a particular period, wherein the at least one transistor component is configured to operate as a card detector component or as an NFC data communication component;
  at least one switch component to switch operation of the at least one transistor to detect a reflective impedance at the particular frequency when operating as the card detector component, and to operate as the NFC data communication component upon detecting the reflective impedance that is substantially decreasing oscillation of the oscillator;
  an oscillation detector configured to detect presence of a coupling card or tag based on a substantially decreased oscillation of the oscillator.

11. The card or tag detector of claim 10, wherein the substantial decrease in the oscillation is due to increased coupling between the NFC antenna and a second antenna of an NFC enabled device.

12. The card or tag detector of claim 10, wherein the oscillator resonates at a particular resonant frequency that comprises about 13.56 MHz for NFC card or tags.

13. The card or tag detector of claim 12, wherein the particular resonant frequency is utilized to avoid false detection of metals.

14. The card or tag detector of claim 10, wherein the oscillator is a Pierce Oscillator.

15. The card or tag detector of claim 10, wherein the oscillation detector comprises a limiting amplifier and another transistor configured as a switch-transistor that generates a logic low output or a logic high output.

16. A method of low-power near field communication (NFC) card or tag detection, the method comprising:
  integrating an NFC antenna with at least one transistor to form an oscillator that resonates at a particular frequency on a particular period, wherein the at least one transistor is configured to operate as a card detector component;
  setting an oscillator resonant frequency;
  detecting a reflective impedance for the oscillator resonant frequency, wherein the reflective impedance facilitates a substantial loss of oscillator oscillation;
  activating operation of an NFC data communication based upon the substantial loss of the oscillator oscillation, wherein the activating includes toggling operation of the at least one transistor from acting as the car detector component into an NFC data communication component.

17. The method of claim 16, wherein the integration comprises switching the at least one transistor to recombine with the NFC antenna.

18. The method of claim 16, wherein the oscillator resonant frequency comprises about 13.56 MHz.

19. The method of claim 16, wherein the substantial loss of the oscillator oscillation indicates presence or detection of the NFC card or tag.

20. The method of claim 16, wherein the formed oscillator is a Pierce Oscillator.

* * * * *